(12) United States Patent
Eser et al.

(10) Patent No.: US 8,538,623 B2
(45) Date of Patent: Sep. 17, 2013

(54) METHOD FOR MONITORING A COOLANT TEMPERATURE SENSOR OF A MOTOR VEHICLE AND CONTROLLER

(75) Inventors: Gerhard Eser, Hemau (DE); Stefan Seyfferth, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 23 days.

(21) Appl. No.: 13/515,040

(22) PCT Filed: Nov. 30, 2010

(86) PCT No.: PCT/EP2010/068552
§ 371 (c)(1),
(2), (4) Date: Jun. 11, 2012

(87) PCT Pub. No.: WO2011/069865
PCT Pub. Date: Jun. 16, 2011

(65) Prior Publication Data
US 2012/0330496 A1    Dec. 27, 2012

(30) Foreign Application Priority Data

Dec. 9, 2009   (DE) .......................... 10 2009 057 586

(51) Int. Cl.
*G01M 17/00*   (2006.01)
*G06F 7/00*    (2006.01)

(52) U.S. Cl.
USPC ........................................................ 701/30.8

(58) Field of Classification Search
USPC .................... 701/29.1, 29.7, 30.3, 30.5, 30.7, 701/30.8, 30.9, 34.4, 113; 123/41.01, 41.08, 123/41.12, 41.44, 406.55; 236/68 R, 68, 236/68 C, 78 BB; 73/1.01, 114.68; 374/1, 374/146
See application file for complete search history.

(56) References Cited

U.S. PATENT DOCUMENTS

| 6,015,317 A | 1/2000 | Hoshiba et al. ................... 440/1 |
| 6,463,892 B1 * | 10/2002 | Russell ....................... 123/41.15 |
| 6,714,854 B2 | 3/2004 | Linenberg et al. ............. 701/113 |
| 6,732,025 B2 * | 5/2004 | Reese et al. ................... 701/31.9 |
| 7,203,617 B1 * | 4/2007 | Rahman et al. ................ 702/130 |
| 7,524,106 B2 | 4/2009 | Higashiyama et al. ........ 374/145 |

(Continued)

FOREIGN PATENT DOCUMENTS

| DE | 19608340 A1 | 9/1997 |
| DE | 19958384 A1 | 6/2001 |

(Continued)

OTHER PUBLICATIONS

German Office Action, German Patent Application No. 10 2009 057 586.3-13, 3 pages, Sep. 27, 2010.

(Continued)

*Primary Examiner* — Mary Cheung
*Assistant Examiner* — Rodney Butler
(74) *Attorney, Agent, or Firm* — King & Spalding L.L.P.

(57) ABSTRACT

A method for monitoring a coolant temperature sensor of a motor vehicle is provided, wherein an actual value (TCOist=TCOSt) of a coolant temperature (TCO) is determined by a coolant temperature sensor when an internal combustion engine of the motor vehicle is started (t=tSt), and the coolant temperature sensor is diagnosed as a functional coolant temperature sensor if the actual value (TCOist) of the coolant temperature (TCO) drops briefly (tmin0) when the internal combustion engine is started (t=tSt). A controller, e.g., an engine controller, for performing such method is also provided.

16 Claims, 1 Drawing Sheet

(56) References Cited

U.S. PATENT DOCUMENTS

| | | | |
|---|---|---|---|
| 8,370,052 B2 * | 2/2013 | Lin et al. | 701/114 |
| 2008/0202452 A1 * | 8/2008 | Wakahara et al. | 123/41.15 |
| 2009/0159021 A1 * | 6/2009 | Kardos | 123/41.12 |
| 2009/0319162 A1 * | 12/2009 | Bommer et al. | 701/113 |

FOREIGN PATENT DOCUMENTS

| | | | |
|---|---|---|---|
| DE | 10120968 A1 | 11/2002 | |
| EP | 1653067 A2 | 5/2006 | |
| WO | 2006/063904 A2 | 6/2006 | |

OTHER PUBLICATIONS

International PCT Search Report, PCT/EP2010/068552, 11 pages, Jun. 15, 2011.

* cited by examiner

METHOD FOR MONITORING A COOLANT TEMPERATURE SENSOR OF A MOTOR VEHICLE AND CONTROLLER

CROSS-REFERENCE TO RELATED APPLICATIONS

This application is a U.S. National Stage Application of International Application No. PCT/EP2010/068552 filed Nov. 30, 2010, which designates the United States of America, and claims priority to German Application No. 10 2009 057 586.3 filed Dec. 9, 2009, the contents of which are hereby incorporated by reference in their entirety.

TECHNICAL FIELD

This disclosure relates to a method for monitoring a coolant temperature sensor of a motor vehicle. The disclosure further relates to a controller, e.g., an engine controller, for performing such method.

BACKGROUND

In the case of an operation of an internal combustion engine of a motor vehicle, knowledge of a coolant temperature of an engine cooling system may be of great importance. For this reason, particular importance may be placed on the monitoring of one or a multiplicity of coolant temperature sensors by legislators. As a result of an erroneous or non-functioning coolant temperature sensor, the internal combustion engine can no longer be actuated in an optimum manner which can lead to increased emissions and damage up to the failure of the internal combustion engine.

For example, the monitoring, i.e., detection, of a "sticking" coolant temperature sensor is required which is carried out in the case of cooling systems with mechanical thermostats when the vehicle is at a standstill. A "sticking" coolant temperature sensor refers in this case to a temperature sensor, the measurement value of which does not change or changes only slightly over a longer time span or exhibits little dynamism in the case of its output measurement value. Such monitoring can be influenced by an auxiliary heater fitted in the motor vehicle when the internal combustion engine is started. It is furthermore desired to also diagnose sticking coolant temperature sensors during operation of the internal combustion engine.

DE 196 08 340 A1 discloses a method for controlling an internal combustion engine which checks before the internal combustion engine is started whether a preheating of the internal combustion engine is carried out by means of a block heater. A difference between a temperature of the internal combustion engine and a temperature of the intake air of the internal combustion engine serves as a measure for this. If this difference lies above a predetermined minimum value, a preheating of the internal combustion engine by means of the block heater is assumed and this is taken into account in the actuation of the internal combustion engine in the case of a current start.

The operation of an auxiliary heater is normally made available to an engine controller of the motor vehicle as information. On the basis of this information, a monitoring of the coolant temperature sensor can be influenced in a corrective manner or suppressed for a specific time, e.g. an overall driving cycle. This information is, however, not always correct when the internal combustion engine is started.

Auxiliary heaters which are retrofitted in the vehicle are furthermore problematic since their influence cannot be taken into account in advance by the manufacturer. Particularly in the case of a motor vehicle fitted with such an "After Market Product" such as e.g. with an engine block heater or a block heater, undesired or dissonant erroneous inputs in a controller can arise in the case of monitoring of the coolant temperature sensor. This can lead to a replacement of a coolant temperature sensor although it is fully functional which thus results in unnecessary costs.

SUMMARY

In one embodiment, a method for monitoring a coolant temperature sensor of a motor vehicle is provided, wherein an actual value ($TCO_{act}=TCO_{St}$) of a coolant temperature (TCO) is determined by a coolant temperature sensor when an internal combustion engine of the motor vehicle is started ($t=t_{St}$), and the coolant temperature sensor is diagnosed as a functional coolant temperature sensor if the actual value ($TCO_{act}$) of the coolant temperature (TCO) drops briefly ($t<t_{min}<t_0$) after the internal combustion engine is started ($t=t_{St}$).

In a further embodiment, a functional coolant temperature sensor is furthermore diagnosed if the actual value ($TCO_{act}$) of the coolant temperature (TCO) rises again ($t>t_{min}$) comparatively briefly after the drop ($t_{St}=>t_{min}$) in the coolant temperature (TCO), and preferably in the event of such a sagging ($t_{St}=>t_0$) of the coolant temperature (TCO) it is assumed after the internal combustion engine is started ($t>t_{St}$) or a coolant pump of a cooling system of the internal combustion engine is started that the internal combustion engine or the motor vehicle has been heated by means of an auxiliary heater.

In a further embodiment, a decision is initially made for the start ($t=t_{St}$) of the internal combustion engine as to whether an unexpectedly high actual value ($TCO_{act}=TCO_{St}$) of the coolant temperature (TCO) is present, and preferably only in such a case, a subsequent ($t>t_{St}$) profile of the actual value ($TCO_{act}$) of the coolant temperature (TCO) is examined in relation to a drop.

In a further embodiment, the actual value ($TCO_{act}=TCO_{St}$) of the coolant temperature (TCO) is compared with an external temperature (TAM), an intake air temperature (TIA) or other temperature information for the start ($t=t_{St}$) of the internal combustion engine, and in the case of a specific deviation of these two temperatures ($\Delta TCO_{St}$), an unexpectedly high actual value ($TCO_{act}=TCO_{St}$) of the coolant temperature (TCO) is output, and the method is carried out thereafter ($t>t_{St}$).

In a further embodiment, a diagnosis of a functional coolant temperature sensor, or a start ($t=t_{St}$) of the internal combustion engine is carried out with previously carried out additional heating of the motor vehicle by:

a predetermined deviation ($TCO_{St}(t_{St})-TCO_{act}(t)$) of the coolant temperature (TCO) downwards in relation to the coolant temperature ($TCO_{St}$) when the internal combustion engine ($t=t_{St}$) or the coolant pump is started;

a predetermined negative gradient of the coolant temperature (TCO) after the internal combustion engine ($t>t_{St}$) or the coolant pump is started;

a predetermined time duration ($t_{St}=>t_0$) in which, after the internal combustion engine ($t>t_{St}$) or the coolant pump is started, the coolant temperature (TCO) deviates downwards from the coolant temperature ($TCO_{St}$) when the internal combustion engine ($t=t_{St}$) is started; and/or a predetermined size of a surface area (A) of a heating curve (TCO) of the coolant temperature (TCO) which is delimited by the heating curve (TCO) after the internal combustion engine ($t \approx t_{St}$) or the coolant pump is started until a specific coolant temperature (TCO) is reached again, in particular the coolant temperature ($TCO_0 = TCO_{St}$) when the internal combustion engine is started ($t = t_0 = t_{St}$); wherein a value determined in comparison with this in each case is preferably a current, averaged, minimum and/or maximum value.

In a further embodiment, profile monitoring of the coolant temperature (TCO) is carried out after the internal combustion engine ($t > t_{St}$) or the coolant pump has started, wherein the profile monitoring is preferably carried out with a tight time-slot pattern at least until the coolant temperature (TCO) rises again ($t \geq t_{min}$) or in particular until the sagging ($t_0$) of the coolant temperature (TCO) ends ($t \geq t_0$). In a further embodiment, a duration of a time window for the start of a drop in the actual value ($TCO_{act}$) of the coolant temperature (TCO) after the internal combustion engine ($t > t_{St}$) or the coolant pump has started, as calculated from the respective start, is 1 s, preferably 0.75 s, particularly preferably 0.4 s, particularly preferably 0.2 s and very particularly preferably 0.1 s.

In a further embodiment, the method is only carried out after a comparatively long shutdown period of the internal combustion engine, and the shutdown period is at least 8 h, preferably at least 7 h, in particular at least 6 h, particularly preferably at least 5 h and very particularly preferably at least 4 h, and/or the method is only carried out at a low external temperature (TAM) which is determined by an ambient temperature sensor, an intake air temperature sensor or otherwise, and the thus determined external temperature (TAM) lies below 10° C., preferably below 5° C., in particular below 0° C., particularly preferably below −5° C. and very particularly preferably below −10° C.

In a further embodiment, the auxiliary heater is a heater which is independent of the internal combustion engine, which heater encompasses an internal or an external electric or combustion auxiliary heater, wherein the auxiliary heater is in particular a preheating system, an engine block heater, a block heater, a fuel auxiliary heater, an auxiliary heater on the air or coolant side, a PTC auxiliary heater, a glow plug and/or a different heating device.

In another embodiment, a controller, in particular engine controller for a motor vehicle, is configured to perform any of the methods described above.

BRIEF DESCRIPTION OF THE DRAWINGS

Example embodiments will be explained in more detail below with reference to figures, in which.

DETAILED DESCRIPTION

Figure 1:
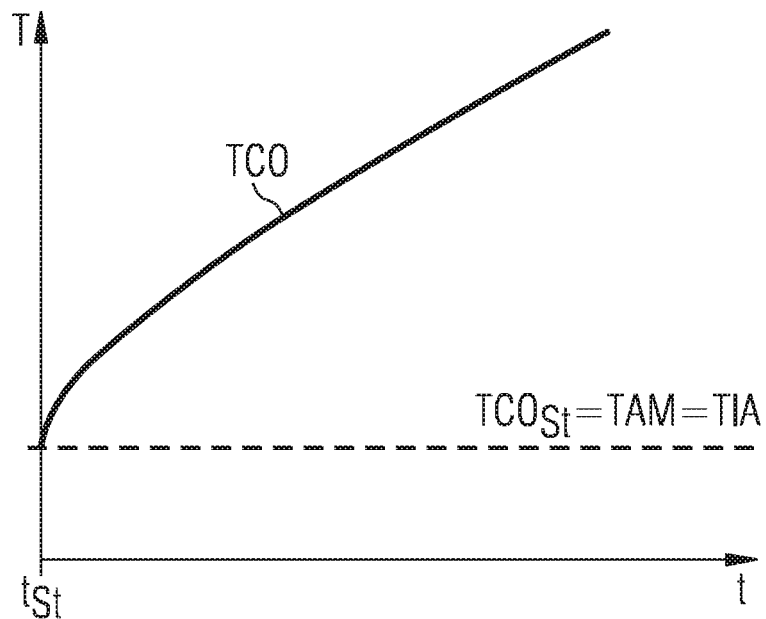
FIG. 1 shows an example temporal profile of a sensor signal of a functional coolant temperature sensor or a proper temporal profile of a coolant temperature for an engine cooling system during and after a cold start of an internal combustion engine of a motor vehicle without a previously operated auxiliary heater.

Some embodiments provide an improved method for monitoring a coolant temperature sensor in a motor vehicle, as well as a controller for this. It may be possible with such method to take into account to take into account a preheating of an engine block and/or a passenger compartment independently of information of a controller. This may also be possible in the case of an auxiliary heater retrofitted in the vehicle. The method may be practicable at as low a cost as possible and in particular manage without additional components on/in the motor vehicle.

In some embodiments of the method, a coolant temperature is determined by a coolant temperature sensor shortly before, for or shortly after, i.e. in the event of a start of an internal combustion engine of the motor vehicle. In the event of a drop in the coolant temperature briefly thereafter, the coolant temperature sensor is diagnosed as a functional coolant temperature sensor. I.e. after the start of the internal combustion engine and/or a start of a coolant pump of a cooling system of the internal combustion engine, the coolant temperature sensor, even in the event of a drop in an actual value of the coolant temperature is diagnosed shortly after a first measurement of the coolant temperature as a functional coolant temperature sensor.

Moreover, the coolant temperature sensor may be diagnosed as a functional coolant temperature sensor when, after dropping, the coolant temperature rises again for a comparatively short time. This need not only be associated with the start of the internal combustion engine, rather can also be a function of the start of the coolant pump. I.e. the initial lowering and the rise in the coolant temperature following shortly thereafter, i.e., a sagging of the coolant temperature, is based on heated coolant in the relevant part of a circuit of the cooling system, whereas a different part of the coolant has a lower temperature, in particular external temperature. I.e. the internal combustion engine or the motor vehicle is heated or preheated by means of an auxiliary heater. This relates in particular to engine block heaters and/or block heaters; other auxiliary heaters can of course also be detected in this manner.

One advantage of certain embodiments lies in the fact that a carried out preheating of the motor vehicle, e.g., that of an interior and/or the internal combustion engine or an engine block, can be detected without the presence of information from an engine control unit. This may be particularly advantageous for retrofitted auxiliary heaters since these are usually not known to the engine control unit, and moreover that such a retrofitted auxiliary heater can be detected by the engine control unit, i.e., at least the presence of an auxiliary heater and where applicable its operation.

Undesired erroneous inputs in relation to the coolant temperature sensor in a controller thus do not come about such that there is no unnecessary search for a garage and unnecessary costs for a replacement of the coolant temperature sensor are not incurred. The motor vehicle is in this regard OBD-compliant (OBD=On Board Diagnosis). Moreover, in the case of low external temperatures too, there are no starting or emission problems of the internal combustion engine because, according to the method disclosed herein, a sticking coolant temperature sensor is not concluded, rather it displays a correct temperature of the coolant.

Embodiments of the method may be easy to apply because information is merely combined in a novel manner in order to arrive at the result provided by the disclosed method. There is no additional structural outlay in at least some embodiments of the method, i.e., the method may be practicable at low cost since it does not require additional components in the motor vehicle and can be implemented for the internal combustion engine, e.g., in a controller such as, e.g., an ECU (Engine Control Unit).

In some embodiments, a decision can be made shortly before, for or shortly after, i.e., when the internal combustion engine is started as to whether an unexpectedly high coolant temperature is present. The further method is carried out thereafter only in such a case, i.e., a subsequent profile of the coolant temperature may be examined in relation to its drop. Should the coolant temperature rise in such a case, no erroneous input in the corresponding controller is likewise carried out which can also be applied to the other embodiments.

In order to detect the unexpectedly high coolant temperature, when starting the internal combustion engine, the coolant temperature can be compared with an external temperature, e.g., determined by an ambient temperature sensor, with an intake air temperature, e.g., determined by an intake air temperature sensor, or with different temperature information, e.g., made available externally in a wireless manner. It is also possible to determine this temperature information by computer from other known values. In the case of a specific deviation, an unexpectedly high coolant temperature is then output and one proceeds as above.

One preferred criterion for the detection of a start of the internal combustion engine with previously carried out heating by an auxiliary heater, i.e., a criterion for a functional, non-sticking coolant temperature sensor is, e.g., a deviation of the coolant temperature downwards in relation to a comparatively high coolant temperature in the case of starting of the internal combustion engine or the coolant pump. A gradient of the comparatively high coolant temperature is furthermore suitable after the start of the internal combustion engine or of the coolant pump.

A time duration may furthermore be suitable for which the comparatively high coolant temperature deviates after the start of the internal combustion engine or the coolant pump downwards from the coolant temperature when starting the internal combustion engine or the coolant pump. Moreover, a size of a surface area of a heating curve of the coolant temperature which is delimited by the heating curve from the start of the internal combustion engine or the coolant temperature until a specific coolant temperature is reached again, in particular the coolant temperature during starting of the internal combustion engine is suitable. A respective criterion can be a current, averaged, maximum and/or minimum value, i.e., a deviation, a gradient, a time duration, a size of the surface area, etc.

Embodiments of the method may be carried out as profile monitoring of the coolant temperature. The profile monitoring is preferably carried out in this case with a tight time-slot pattern, e.g., a 50 ms, 75 ms, 100 ms, 125 ms, 150 ms, 200 ms or 250 ms grid, preferably at least until a rise again in the coolant temperature or in particular at least until an end of the sagging of the coolant temperature, i.e., until the coolant temperature initially measured is reached again.

A time window can be produced between the first measurement of the coolant temperature when the internal combustion engine or the coolant pump is started and the start of the drop in the coolant temperature, i.e., within this time span, the coolant temperature does not change substantially or even rises. Only thereafter can the drop then be observed. A duration of the time window for a start of the drop in the coolant temperature can be 0.05 s to 2 s, in particular 0.15 s to 1.5 s and preferably 0.25 s to 1.25 s.

A time duration of the drop, remaining at a low level, rising again up to a certain value, in particular the value of the first measurement, and/or a total duration until a specific value is reached again, in turn in particular the value of the first measurement, of the coolant temperature, is different depending on the cooling system and the originally measured coolant temperature. Here, experienced values or simulated values are preferably used, wherein it is important to take into account, in addition to the dimensions of the cooling system, an influence of a rotational speed of the coolant pump. Intermediate values can, for example, be interpolated or simulated.

Moreover, in some embodiments it is possible to use, instead of a first measurement or a first value/measurement value of the coolant temperature, a later measurement, e.g., the first measurement value or the initial measurement values may be ignored and the method started only thereafter. For example, the "first" measurement value for the method can be that which assumes a first lower measurement value, wherein a lower measurement value refers to a measurement value which deviates downwards by a specific amount from the previous measurement value. This amount may be specified in advance and is an empirical or simulated value.

In the case of a cold start of an internal combustion engine, the shutdown period of which was long enough that a temperature of the internal combustion engine was aligned with an external temperature TAM, a coolant temperature TCO of a cooling system of the internal combustion engine is equal to external temperature TAM and thus also to an intake air temperature TIA of the internal combustion engine: $TCO=TCO_{setp}=TAM=TIA$. See also the horizontal dashed line in FIG. 1. In the case of a start of this internal combustion engine, one would recognize and display a defective, high-sticking coolant temperature sensor since in such a case a sensor value TCO represents a coolant temperature TCO which is greater than external temperature TAM or intake air temperature TIA of the internal combustion engine: $TCO>TAM=TIA$.

In the case of low external temperatures TAM, auxiliary heaters are used in the motor vehicle. Such an auxiliary heater is a heater which is independent of the internal combustion engine, which heater can be an internal or an external electric or combustion auxiliary heater. The auxiliary heater is e.g. a preheating system, an engine block heater, a block heater, a fuel auxiliary heater, an auxiliary heater on the air or coolant side, a PTC auxiliary heater, a glow plug and/or a different heating device. If such an auxiliary heater was active before a start of the internal combustion engine after a long shutdown period, a similar equalization of temperatures comes about: $TCO>TAM=TIA$. I.e. although the coolant temperature sensor functions in a fault-free manner, it is recognized as erroneous by a diagnosis which compares the temperatures and is correspondingly entered in a fault storage memory of an engine control unit and is unnecessarily replaced on the next visit to the garage.

Figure 2:
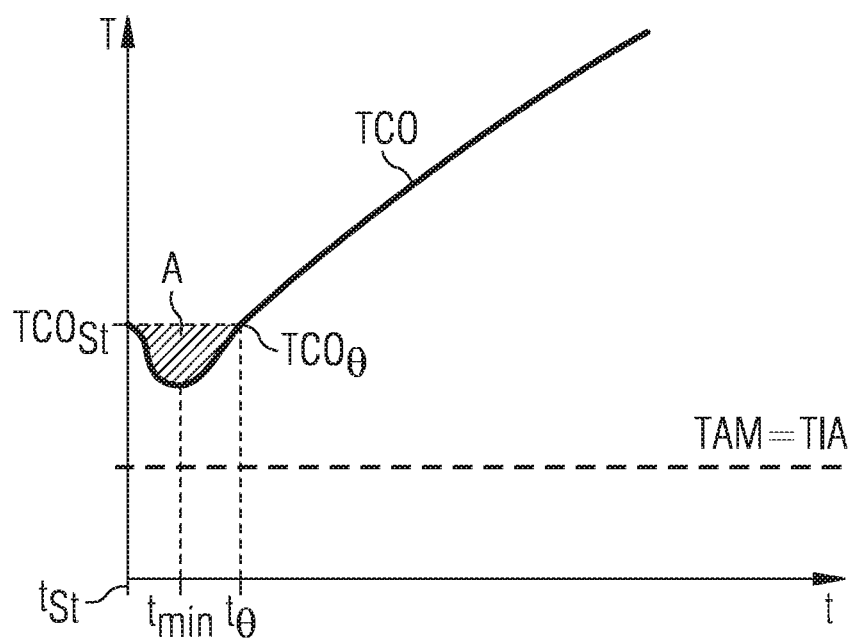
FIG. 2 shows an example temporal profile of the sensor signal or the coolant temperature in an analogous manner to FIG. 1, but with a previously operated auxiliary heater of the motor vehicle which is independent of the internal combustion engine.

FIG. 1 shows the starting of an internal combustion engine without a previously operated auxiliary heater. From a time $t_{St}$ of the start of the internal combustion engine, coolant temperature TCO rises continuously in the initial minutes. FIG. 2 shows a similar case, however with a previously operated auxiliary heater. In the case of such a start, after the motor vehicle has been shutdown for a long time, measured coolant temperature TCO is higher than external temperature TAM and intake air temperature TIA. Since an auxiliary heater does not evenly heat up all the coolant, a brief sagging of the coolant temperature is to be expected after the start of the internal combustion engine or a start of a coolant pump.

See in the regard the profile of the curve of coolant temperature TCO after the start of the internal combustion engine or the coolant pump between times $t_{St}$ and $t_0$. In this case, coolant temperature TCO initially falls to a minimum value at time $t_{min}$ and then rises again until it once again reaches its starting value $TCO_{St}=TCO_0$ at time $t_0$. The sagging of coolant temperature TCO is in this case characterized by a surface area A which is surrounded or enclosed by coolant temperature TCO between times $t_{St}$ and $t_0$.

A start of the internal combustion engine or the coolant pump with previously carried out auxiliary heating of the motor vehicle can be identified according to the method disclosed herein, as a result of the sagging of the coolant temperature, even without digital information from the engine control unit by this component. This is carried out e.g. by a delta of the sagging of coolant temperature TCO ($TCO_{St}$-$TCO_{current}$) or a negative gradient of coolant temperature TCO shortly after the relevant start. Moreover, a time duration $t=>t \leq t_0$ in which coolant temperature TCO deviates downwards after the corresponding start is suitable. Surface area A can furthermore be used which is drawn after the relevant start from a heating curve of coolant temperature TCO up to a specific time $t \leq t_0$, in particular this specific time $t_0$ in the case of which current coolant temperature $TCO_{current}$ is once again equal to coolant temperature $TCO_{St}$ in the case of corresponding start $t_{St}$.

In some embodiments, the method disclosed herein is only carried out after a comparatively long parking time, wherein the shutdown period is preferably at least approx. 4 h to 8 h. Moreover, the method may be carried out only at low external temperatures TAM, e.g., at external temperatures below 10° C., in particular below 0° C.

What is claimed is:

1. A controller programmed to:
   determine whether an internal combustion engine has been shut down for a period of at least four hours and if a measured external temperature is below 10° C.;
   then, if both conditions are met:
   automatically determine an actual value of a coolant temperature by a coolant temperature sensor when an internal combustion engine of the motor vehicle is started, and
   automatically diagnose the coolant temperature sensor as being functional if the actual value of the coolant temperature drops during a predetermined time period after the internal combustion engine is started.

2. The controller of claim 1, further programmed to:
   automatically diagnose a functional coolant temperature sensor if the actual value of the coolant temperature rises again after the drop in the coolant temperature, and
   if the actual value of the coolant temperature rises again after the drop in the coolant temperature, automatically determine that the internal combustion engine or the motor vehicle has been heated by means of an auxiliary heater.

3. The controller of claim 1, further programmed to compare the actual coolant temperature with an external temperature.

4. The controller of claim 1, further programmed to compare the actual value of the coolant temperature with an external temperature, an intake air temperature, or other temperature information before the start of the internal combustion engine.

5. The controller of claim 1, further programmed to perform profile monitoring of the coolant temperature after the internal combustion engine or a coolant pump has started, wherein the profile monitoring is performed with a tight time-slot pattern at least until the coolant temperature rises again.

6. The controller of claim 1, wherein a duration of a time window for the start of a drop in the actual value of the coolant temperature after the internal combustion engine or the coolant pump has started, as calculated from the respective start, is 1 s or less.

7. A method for determining whether a coolant temperature sensor of a motor vehicle is functional, the method comprising:
   automatically determining an actual value of a coolant temperature with the coolant temperature sensor for a time period beginning when an internal combustion engine of the motor vehicle is started, and
   automatically diagnosing the coolant temperature sensor as being functional if the actual value of the coolant temperature drops for a predetermined time period after the internal combustion engine is started,
   wherein the method is only carried out if the internal combustion engine has been shut down for a period of at least four hours and if a measured external temperature is below 10° C.

8. The method of claim 7, further comprising:
   diagnosing a coolant temperature sensor as being functional if the actual value of the coolant temperature rises again after the drop in the coolant temperature, and
   if the actual value of the coolant temperature rises again after the drop in the coolant temperature, determining that the internal combustion engine or the motor vehicle has been heated by means of an auxiliary heater.

9. The method of claim 7, further comprising comparing the coolant temperature with an external temperature.

10. The method of claim 7, further comprising comparing the actual value of the coolant temperature with an external temperature, an intake air temperature, or other temperature information before the start of the internal combustion engine.

11. The method of claim 7, comprising performing a diagnosis of a functional coolant temperature sensor, or a start of the internal combustion engine, with previous additional heating of the motor vehicle by at least one of:
   a predetermined deviation of the coolant temperature downwards in relation to the coolant temperature when the internal combustion engine or a coolant pump is started;
   a predetermined negative gradient of the coolant temperature after the internal combustion engine or the coolant pump is started;
   a predetermined time duration in which, after the internal combustion engine or the coolant pump is started, the coolant temperature deviates downwards from the coolant temperature when the internal combustion engine is started; and
   a predetermined size of a surface area of a heating curve of the coolant temperature which is delimited by the heating curve after the internal combustion engine or the coolant pump is started until a specific coolant temperature is reached again, in particular the coolant temperature when the internal combustion engine is started.

12. The method of claim 7, comprising performing profile monitoring of the coolant temperature after the internal combustion engine or a coolant pump has started, wherein the profile monitoring is performed with a tight time-slot pattern at least until the coolant temperature rises again.

13. The method of claim 7, wherein a duration of a time window for the start of a drop in the actual value of the coolant temperature after the internal combustion engine or a coolant pump has started, as calculated from the respective start, is 1 s or less.

14. The method of claim 7, wherein the motor vehicle includes an auxiliary heater operating independently of the internal combustion engine, and encompasses an internal or an external electric or combustion auxiliary heater.

15. A method for determining whether a coolant temperature sensor of a motor vehicle is functional, the method comprising:

automatically determining an actual value of a coolant temperature with the coolant temperature sensor for a time period beginning when an internal combustion engine of the motor vehicle is started, and automatically diagnosing the coolant temperature sensor as being functional if the actual value of the coolant temperature drops for a predetermined time period after the internal combustion engine is started, wherein the method is only carried out if a measured external temperature is below 0° C.

16. The method of claim 15, wherein the method is only carried out if a measured external temperature lies below −10° C.

* * * * *